(12) United States Patent
Manzoor et al.

(10) Patent No.: US 8,091,450 B2
(45) Date of Patent: Jan. 10, 2012

(54) DECOUPLED VIBRATION DAMPER

(75) Inventors: Suhale Manzoor, Cement City, MI (US); Bruce G. Christenson, Canton, MI (US)

(73) Assignee: Metavation, LLC, Southfield, MI (US)

( * ) Notice: Subject to any disclaimer, the term of this patent is extended or adjusted under 35 U.S.C. 154(b) by 660 days.

(21) Appl. No.: 12/195,023

(22) Filed: Aug. 20, 2008

(65) Prior Publication Data
US 2009/0078079 A1   Mar. 26, 2009

Related U.S. Application Data

(63) Continuation-in-part of application No. 11/861,921, filed on Sep. 26, 2007.

(51) Int. Cl.
F16C 15/00 (2006.01)
F16F 15/12 (2006.01)
F16D 3/00 (2006.01)

(52) U.S. Cl. ........... 74/574.4; 74/572.2; 464/73; 464/74

(58) Field of Classification Search .......... 74/574.4, 74/572.21, 571.11, 572.12, 572.2; 464/73, 464/74; 254/327; 482/93, 114
See application file for complete search history.

(56) References Cited

U.S. PATENT DOCUMENTS

| | | | |
|---|---|---|---|
| 1,758,274 A | 5/1930 | Butenkoff | |
| 2,474,370 A * | 6/1949 | Russell | 74/571.11 |
| 2,779,211 A | 1/1957 | Henrich | |
| 3,136,178 A | 6/1964 | O'Connor | |
| 3,285,096 A | 11/1966 | O'Connor | |
| 3,462,136 A | 8/1969 | Rumsey | |
| 3,577,802 A | 5/1971 | Rumsey | |
| 4,037,431 A * | 7/1977 | Sugimoto | 464/73 |
| 4,044,628 A | 8/1977 | Jacks | |
| 4,114,472 A * | 9/1978 | Hornig et al. | 74/574.4 |
| 4,483,214 A * | 11/1984 | Mayer | 74/572.21 |
| 4,486,183 A * | 12/1984 | Posiviata et al. | 474/94 |
| 4,516,955 A * | 5/1985 | Worner et al. | 464/89 |
| 4,537,580 A | 8/1985 | Loizeau et al. | |
| 4,914,949 A | 4/1990 | Andra et al. | |
| 5,109,727 A | 5/1992 | Joyce | |
| 5,138,902 A * | 8/1992 | Muller et al. | 74/574.4 |
| 5,209,461 A | 5/1993 | Whightsil, Sr. | |
| 5,352,157 A | 10/1994 | Ochs et al. | |
| 5,735,746 A | 4/1998 | Colford | |
| 5,784,926 A * | 7/1998 | Maass | 74/572.12 |
| 6,031,034 A | 2/2000 | Morimoto et al. | |
| 6,085,815 A * | 7/2000 | Piper et al. | 152/165 |
| 6,220,970 B1 * | 4/2001 | Berger et al. | 464/180 |
| 6,308,810 B1 | 10/2001 | Kuwayama | |
| 6,440,044 B1 * | 8/2002 | Francis et al. | 482/114 |

(Continued)

OTHER PUBLICATIONS

International Search Report and Written Opinion, PCT/US08/76513, mailed Nov. 24, 2008.

*Primary Examiner* — Vinh T. Luong
(74) *Attorney, Agent, or Firm* — Wood, Herron & Evans, LLP

(57) ABSTRACT

A torsional vibration damper includes a one-piece integral hub and annular inertia mass assembly. Between the hub and the inertia mass are intermediate rings connected integrally with the mass and the hub connected integral spokes. Elastomeric members are compression fitted within spaces formed between the hub and the mass. With this design, the damper can be formed from a polymeric material with an embedded annular weight.

4 Claims, 7 Drawing Sheets

U.S. PATENT DOCUMENTS

| | | |
|---|---|---|
| 6,675,759 B2 | 1/2004 | Johnson et al. |
| 6,682,060 B2 | 1/2004 | Kato et al. |
| 6,725,985 B2 | 4/2004 | Haneishi et al. |
| 6,883,653 B2 | 4/2005 | Kato et al. |
| 7,055,243 B2 | 6/2006 | Hodjat et al. |
| 7,150,679 B2 | 12/2006 | Pape et al. |
| 7,306,067 B2 * | 12/2007 | Yamamoto .................... 180/186 |
| 7,654,939 B1 * | 2/2010 | Lin ................. 482/93 |
| 2001/0010109 A1 | 8/2001 | Jager |
| 2003/0024345 A1 | 2/2003 | Hodjat et al. |

* cited by examiner

DECOUPLED VIBRATION DAMPER

RELATED APPLICATION

This application is a continuation-in-part application of U.S. patent application Ser. No. 11/861,921, filed on Sep. 26, 2007. The entire disclosure of this earlier-filed application is incorporated herein by reference.

BACKGROUND OF THE INVENTION

Torsional vibration dampers are employed extensively in internal combustion engines to reduce torsional vibrations delivered to rotatable shafts. The torsional vibrations may be of considerable amplitude, and, if not abated, can potentially damage gears or similar structures attached to the rotatable shaft and cause fatigue failure of the rotatable shaft.

Torsional vibration dampers convert the kinetic vibrational energy by dissipating it to thermal energy as a result of damping. The absorption of the vibrational energy lowers the strength requirements of the rotatable shaft and thereby lowers the required weight of the shaft. The torsional vibration damper also has a direct effect on inhibiting vibration of nearby components of the internal combustion engine that would be affected by the vibration.

The simplest insertion style torsional vibration damper has three components, a hub that allows the damper to be rigidly connected to the source of the vibration, an inertia ring, and an elastomeric strip in the same shape as the ring. The elastomeric strip provides the spring dashpot system for the damper. The hub and the inertia ring are manufactured individually and machined before the elastomer is inserted by force into the gap that is present between the hub and the inertia ring. The elastomer is compressed and exerts a pressure between the metallic surfaces of the ring and hub, holding the assembly in place. There are several design problems with these dampers.

The bore of the hub and grooves in the ring have to meet very tight tolerances with respect to each other radially and axially. That sometimes forces the parts to be machined after assembly. With two separate parts, there can be two separate machining steps. The elastomer assembly process contributes to wavy rubber and, hence, product scrap. Further, the hub of the damper adds parasitic inertia to the system.

For any mechanical system, the torsional natural frequency depends upon the inertia, torsional stiffness and damping of the system. In the traditional torsional vibration damper, the inertia is provided by the inertia ring, while the damping and torsional stiffness are provided by the elastomer strip. This otherwise implies that the hub is, in fact, a rigid attachment that does not provide any significant help to the damping system except to provide a rigid means of connection to the rotating component of the vehicle. Thus, the damping, by definition, is caused by energy dissipation in the form of heat due to frictional and/or other causes. In the standard torsional vibration damper, the shearing of the elastomer between the hub outer diameter and the ring inner diameter causes the relative motion of the elastomer and, therefore, promotes damping. This inherently causes a shear strain buildup in the elastomer.

Further, weight reduction is critical. Making a portion of the damper from a composite would provide significant weight reduction.

SUMMARY OF THE INVENTION

The present invention is premised on the realization that a torsional vibration damper suitable for automotive applications, as well as others, can be formed with an integral hub/inertia mass structure. The inner hub is connected to the inertia ring by a series of spokes which, in turn, lead to one or more intermediate rings or webs connected, in turn, to the inertia ring by outer spokes. This provides regions or windows between the hub and the intermediate web, as well as between the web and the inertia ring. The spokes and web are designed to flex and/or deform in use. At least some of the windows can be filled with elastomeric members that provide the dashpot. The dashpots are forced into these windows and held in position by pressure that they exert on the spokes and web. The bending of the spokes and web deforms the windows and the elastomeric inserts and thereby dampen vibration.

This design allows the inertia ring grooves and the hub bore to be machined in a single operation, thereby eliminating the run-out issues seen in the assembly of traditional torsional vibration dampers.

Also, the design allows the damper to be formed from a composite with an annular mass embedded in the composite damper.

The objects and advantages of the present invention will be further appreciated in light of the following detailed description and drawings in which:

DETAILED DESCRIPTION

Figure 1:
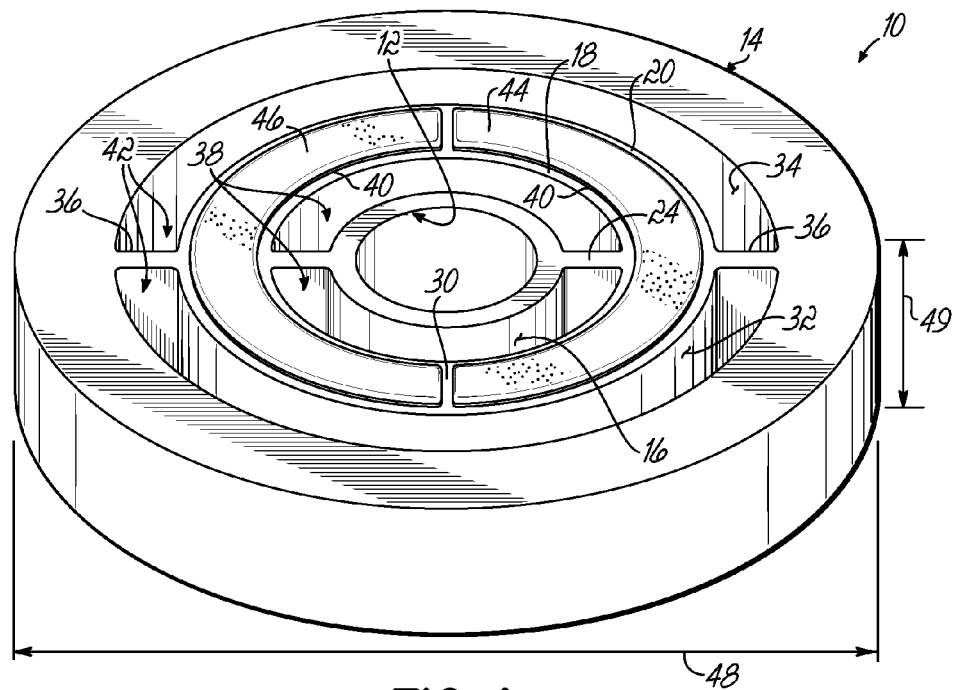
FIG. 1 is an isometric view of a torsional vibration damper made according to the present invention.

As shown in FIG. 1, the present invention is a damper 10 that includes a hub 12 and an outer annular inertia mass 14 formed integrally with the hub. Between the outer peripheral surface 16 of hub 12 and the inertia mass 14 are a first inner ring 18 and a second intermediate ring 20. The first inner ring 18 is connected to the outer surface 16 of hub 12 by first innermost spokes 24 which extend from the inner surface 22 of ring 18 to the outer surface 16 of hub 12. Extended between the outer surface 26 of ring 18 and the inner surface 28 of ring 20, are a second set of intermediate spokes 30, which connect the inner ring 18 to the intermediate ring 20. Finally, extended between the outer surface 32 of ring 20 to the inner surface 34 of inertia mass 14, are a third set of outer spokes 36. Preferably, the hub 12, inertia mass 14, as well as rings 18 and 20 and spokes 24, 30 and 36, are all integrally formed.

This structure defines innermost arcuate spaces 38 between the hub 12 and the first inner ring 18 and spokes 24. Intermediate arcuate spaces 40 are then formed between rings 18 and 20 and spokes 30, and outermost arcuate spaces 42 are formed between the ring 20 and inertia mass 14 bordered by the third spokes 36. Arcuate spaces 40, in turn, are filled by first and second elastomeric members or dashpots 44 and 46 respectively.

The damper 10 is designed to absorb vibration in a defined frequency ranges within permitted space limitations. Thus, the thickness of the overall damper 10, the total mass of the inertia mass 14, as well as its total inertia, and the thickness of the spokes and inner and outer rings, can all be varied in order to achieve desired dampening.

In a typical automotive application, the diameter 48 of damper 10 can be anywhere from about 100 mm to about 200 mm. The general inertia requirements may vary widely and can be anywhere from about 5000 kg·mm$^2$ to about 30,000 kg·mm$^2$. Typical torsional damper vibration widths 49 are usually from about 20 mm to about 60 mm.

The design limitations of the spokes and rings will vary also, depending upon the particular material used to form the damper. The damper can be formed from any metal used for torsional vibration dampers. These include steel, ductile iron, grey iron and aluminum, as well as composites. Again the physical characteristics of the material will affect the design of the damper 10.

The damper, including the hub, inner ring, intermediate ring, inertia ring, and spokes, are all integrally formed. It can be formed in a variety of different manners. It can be extruded, cast and subsequently machined, shell molded, or completely machined.

When casting the damper, it is important to maintain the tight casting tolerances in the metallic surfaces that constitute the torsional spring. If the metallic thickness varies, then so will the frequency from part to part.

Once the damper is initially formed, the inertia ring grooves and hub bore (not shown), and washer face can all be machined in a single operation.

Figure 1A:
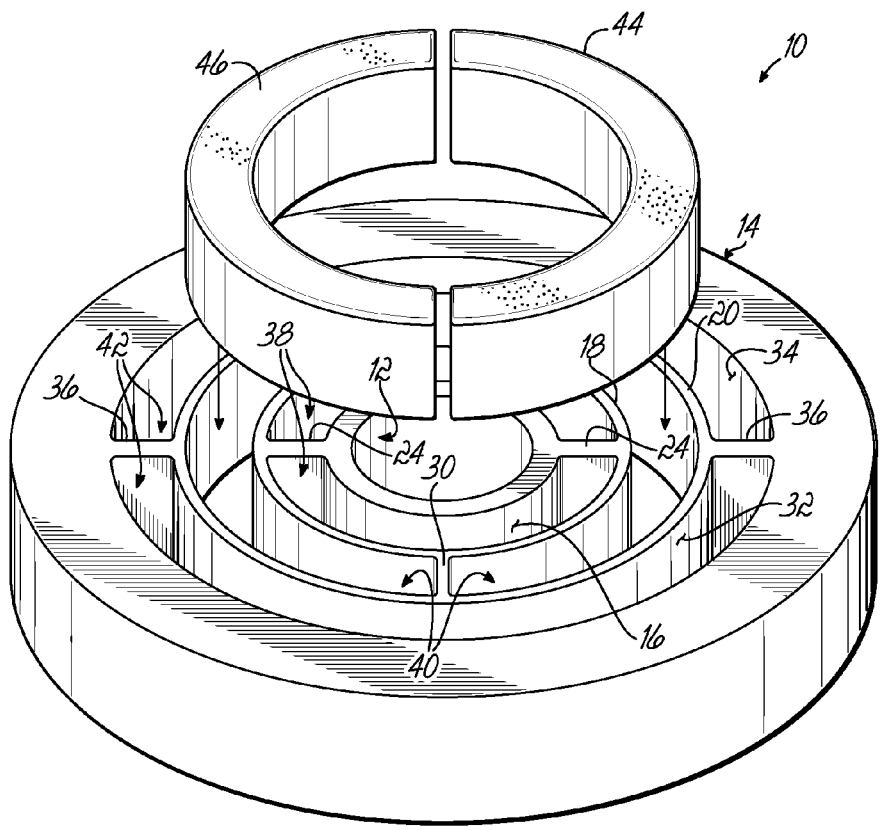
FIG. 1A is an exploded view of the vibration damper shown in FIG. 1.

The dashpots 44 and 46 can be formed by extrusion compression, transfer or injection molding. These are formed from an elastomeric material having a damping coefficient designed to meet end use requirements. Suitable elastomeric materials include chlorobutyl, bromobutyl, nitrile rubber, butyl rubber, and EPDM, we well as others. Preferably, the damping coefficient of the rubber member should be about 7% to about 25%. Once the damper is formed and machined, the elastomeric members are compression fitted into the desired arcuate spaces. As shown in FIGS. 1 and 1A, the elastomeric members 44 and 46 are compression fitted into the intermediate arcuate spaces 40. Generally, these will be under about 30% percentage compression. Again this can be modified depending upon design limitation.

The damper 10 can be modified in a variety of different manners, again designed to achieve end use requirements.

Figure 2:
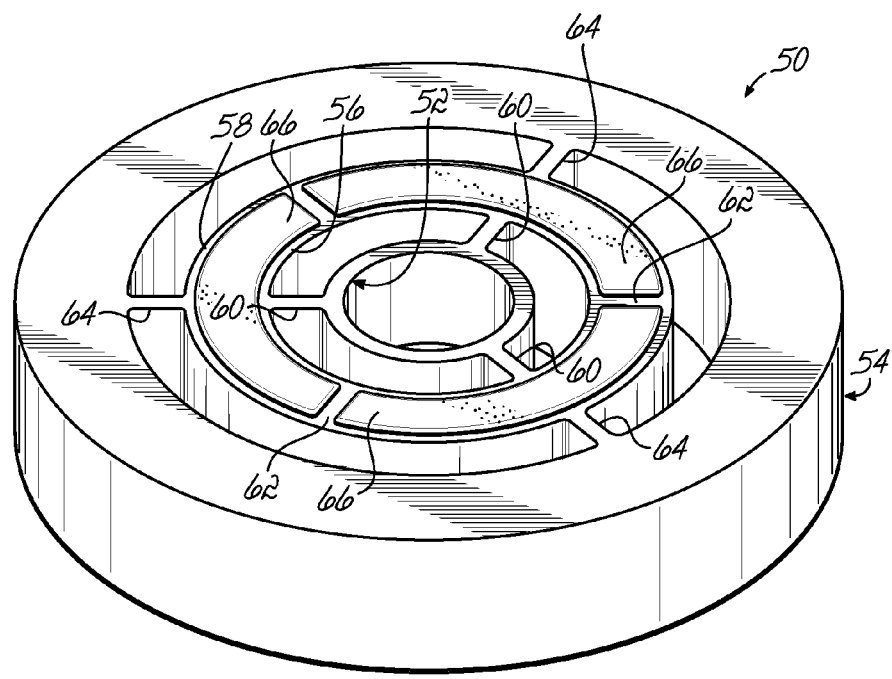
FIG. 2 is an isometric view of an alternate embodiment of the present invention.

A first alternate embodiment of the present invention is shown in FIG. 2. In this embodiment, the damper 50 includes an inner hub 52, an outer inertia mass 54, and an inner ring 56, and an intermediate ring 58. The hub 52 is connected to the inner ring 56 by three spokes 60. Likewise, the inner ring 56 is connected to the intermediate ring 58 with three spokes 62, and the outer ring is connected to the inertia mass 54 by three spokes 64. Three arcuate elastomeric members or dashpots 66 are located between the three spokes 62 between the inner ring and the outer ring. This effectively stiffens the torsional spring and restrains the motion of the absorption or dashpot system, reduces the strain on the elastomer, but correspondently reduces the damping of the system.

Figure 3:
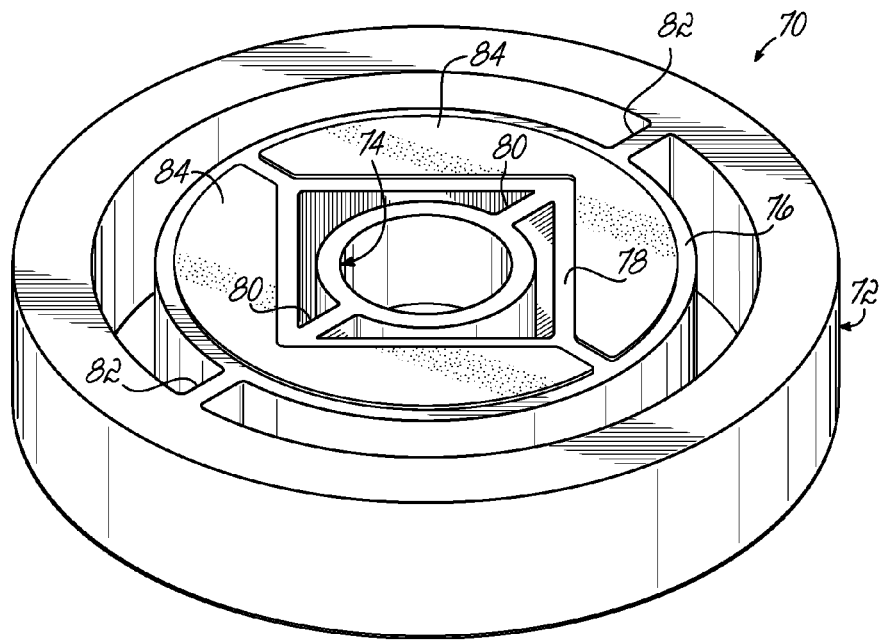
FIG. 3 is an isometric view of a second alternate embodiment of the present invention.

FIG. 3 shows a second alternate embodiment in which the damper 70 includes an inertia mass 72, an inner hub 74 and an intermediate ring 76. Instead of an inner ring, as shown in FIGS. 1 and 2, the damper 70 has a rectangular member 78 which surrounds the hub 74 and is connected to the hub by spokes 80. the ring 76, in turn, is attached to the inertia mass 72 by spokes 82. Elastomeric members or dashpots 84 are located between the rectangular member 78 and the ring 76. This change in geometry can be made to accommodate enlarged elastomeric members or dashpots, and to provide necessary stiffness. There are basically unlimited methods of adjusting the spring geometry by varying the geometries of the various portions.

Figure 4:
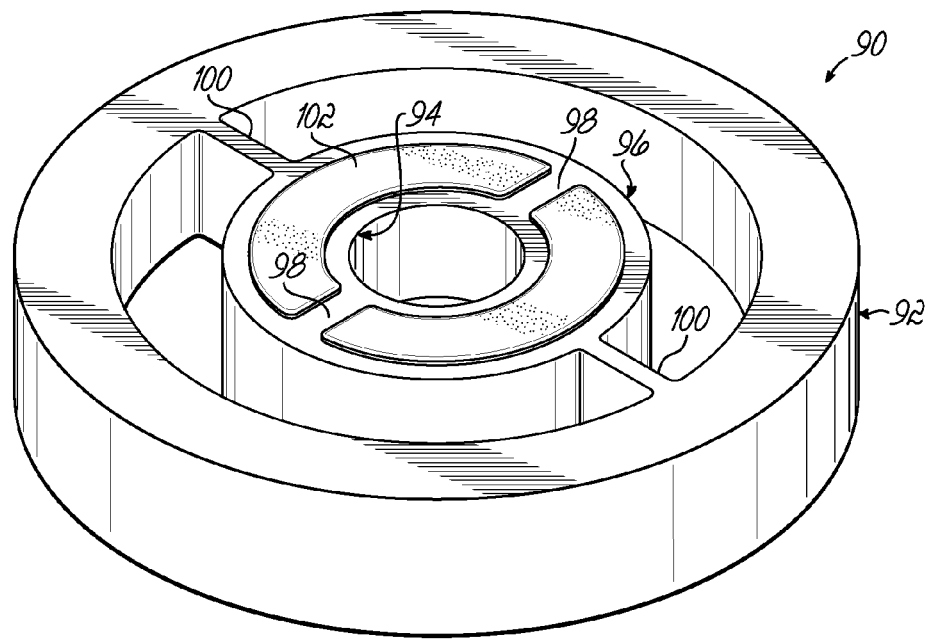
FIG. 4 is an isometric view of a third alternate embodiment of the present invention.

A third option is shown in FIG. 4. The damper 90 again includes an inertia mass 92 and a hub 94. There is a single intermediate ring 96 between the hub 94 and the inertia mass 92. A first set of spokes 98 extend between the hub and the intermediate ring 96 and a second series of spokes 100 extend between the intermediate ring 96 and the inertia mass 92. As shown, the spokes 98 are wider than spokes 100 to increase stiffness. Again, elastomeric members 102 are located in the arcuate space between the hub 94 and the intermediate ring 96.

Figure 5:
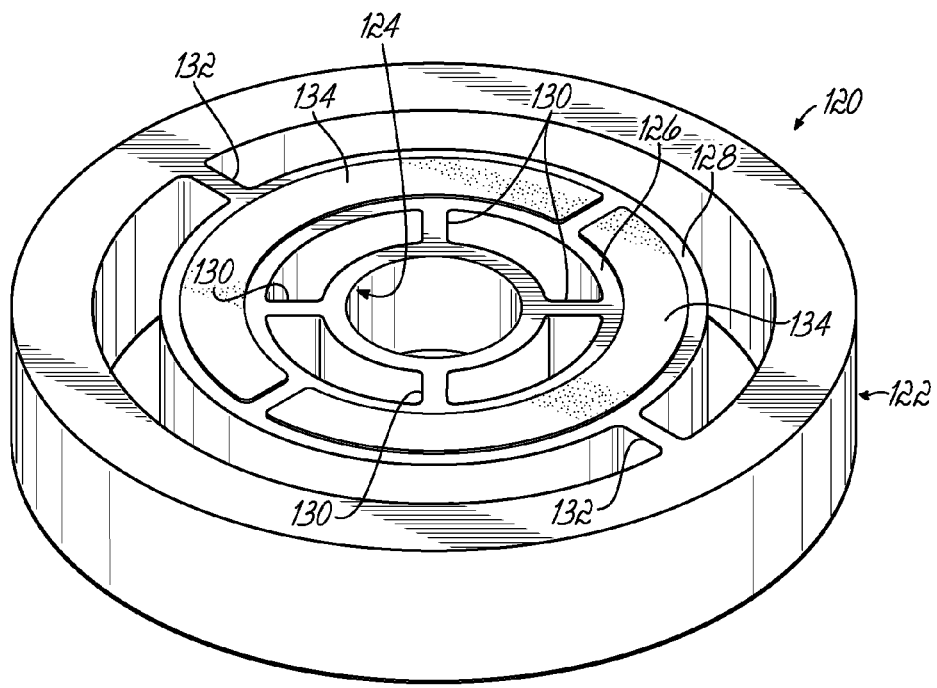
FIG. 5 is an isometric view of a fourth alternate embodiment of the present invention.

FIG. 5 shows an additional embodiment. The damper 120 again has an outer inertia mass 122 and an inner hub 124. First and second rings 126 and 128 are positioned between the hub 124 and the inertia mass 122. In this embodiment the hub is connected to the first ring 126 by a set of four spokes 130. The ring 128, in turn, is connected to the inertia mass 122 by a set of two spokes 132. Dashpots 134 are then located in the arcuate spaces between rings 126 and 128.

Figure 6:
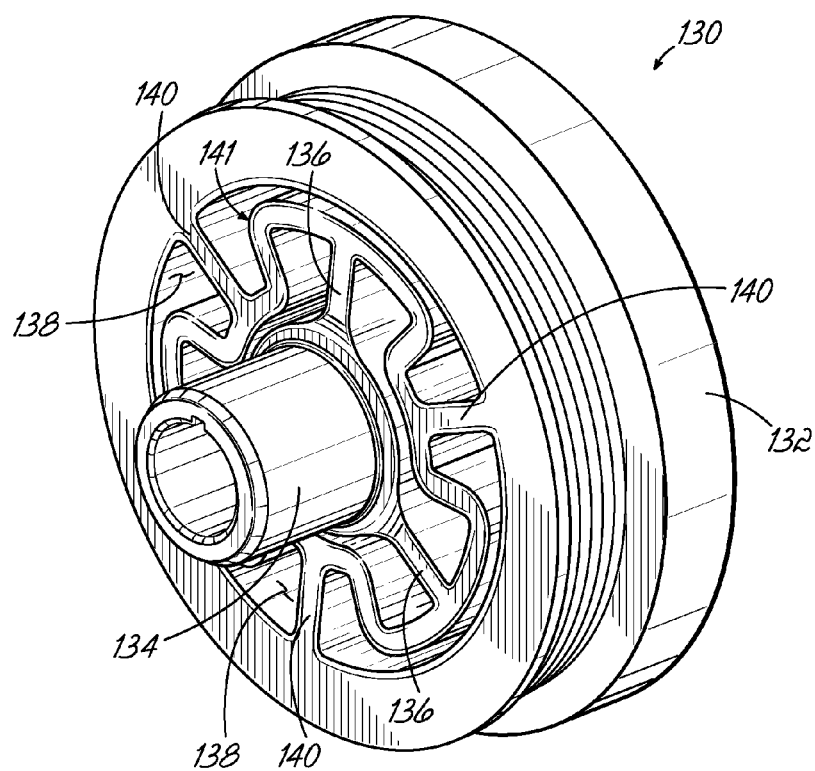
FIG. 6 is an isometric view of a fifth alternate embodiment of the present invention.
Figure 7:
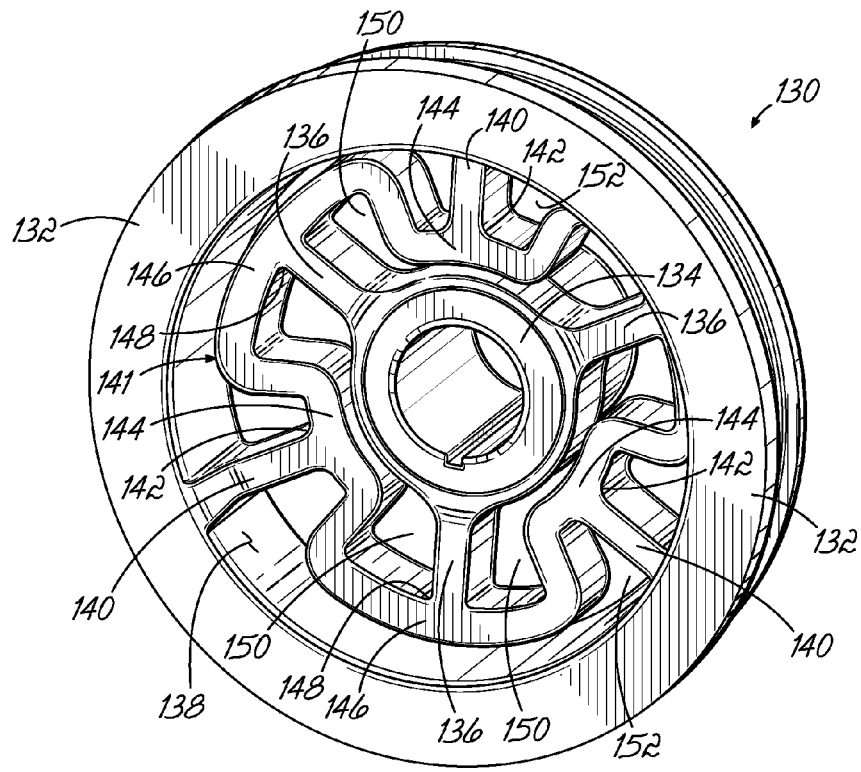
FIG. 7 is an isometric view of the embodiment shown in the FIG. 6 from the opposite side.

FIG. 6 and FIG. 7 represent fourth alternate embodiments of the present invention. As shown, these embodiments include a vibration damper 130. As with the previous embodiments, the damper 130 includes an annular ring 132 and an inner hub 134. Three partial spokes 136 extend radially outward from the hub 134, towards, but not all the way to, the annular ring 132. As shown, these partial spokes extend greater than half the distance from the hub 134 to the inner surface 138 of the annular ring 132. Likewise, three spokes 140 extend inwardly from the surface 138 of ring 132 towards the hub 134, but not all the way to the hub 134. As shown, they extend greater than half the distance. A serpentine web 141 or member connects the spokes 140 and 136 together.

As shown, this serpentine web 141 extends from an inner edge 142 of spoke 140 laterally outward on either side to form a T-member 144. From the T-member 144, the web 141 extends away from the hub 134 to T-members 146, which are at the ends 148 of the outwardly extended spokes 136. This forms a continuous web connecting sequentially all of the inner and outer partial spokes 140 and 136.

Figure 11:
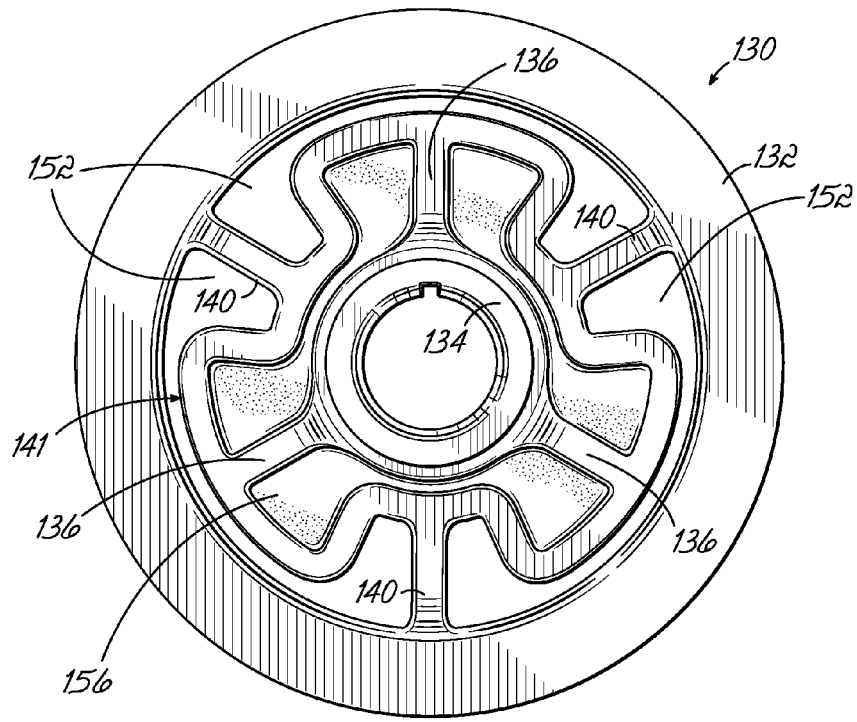
FIG. 11 is a perspective view of the embodiment shown in FIG. 6 with elastomeric vibration absorbers located within the windows.

In this embodiment, the T-members 144 and 146 flex to counter vibration. In the embodiment shown in FIG. 11, the open areas or windows 150 and 152, between the hub and the web or between the web and the annular ring respectively, can be filled with an elastomeric member 156 that will act as a dashpot, as shown in FIG. 11. Depending upon the material that the damper is made from, and the particular vibrations, these dashpots may or may not be required. However, when the damper, including the spokes and the serpentine web, are formed from metal such as gray iron, these dashpots will generally be required.

All of these different embodiments demonstrate the design flexibility provided by the present invention.

Figure 9:
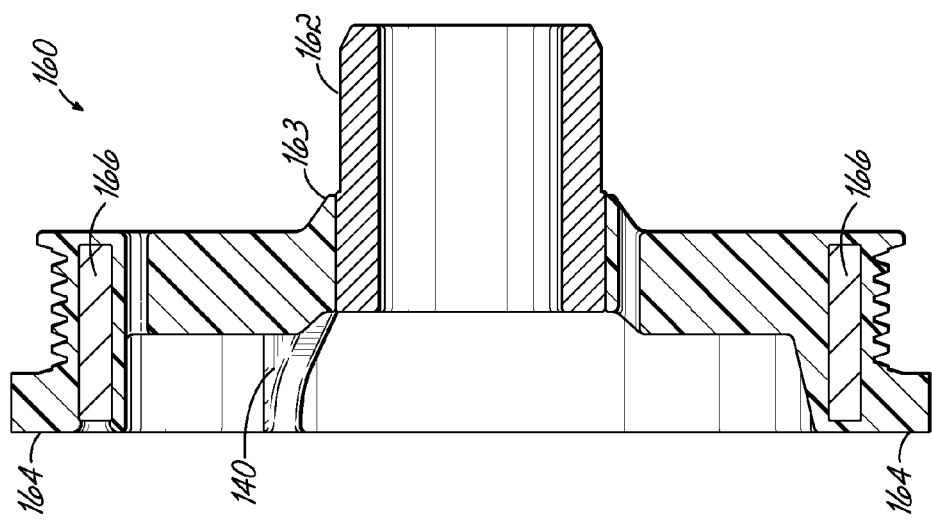
FIG. 9 is a cross sectional view taken at lines 9-9 of FIG. 8.
Figure 8:
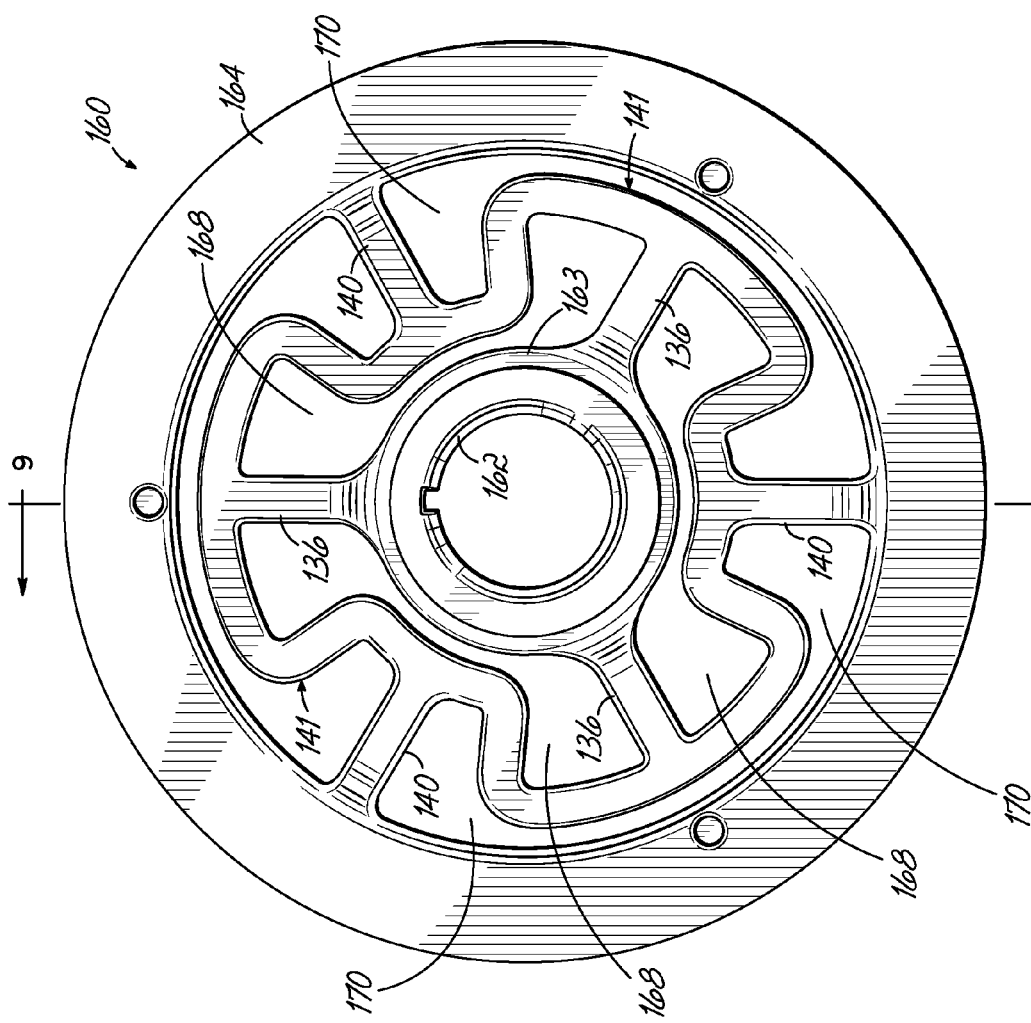
FIG. 8 is a plan view of a sixth alternate embodiment of the present invention.

Another alternate embodiment of the present invention is shown in FIGS. 8 and 9. In this embodiment, the vibration damper 160 is formed from a composite material. It includes the same inner and outer spokes 136 and 140 as the embodiment shown in FIG. 6, as well as the same serpentine web 141. However, these, as well as the annular ring 164, are formed from a polymeric material such as a fiber reinforced nylon material. One polymer which has been found particularly suitable is a polyamide composite having a reinforcing filler of a relatively rigid material, such glass, ceramic or carbon. The reinforcing filler may have the form of fibers or other suitable geometrical forms as are familiar to those of ordinary skill in the art.

An exemplary family of glass-reinforced polyamides based on a nylon copolymer is manufactured and sold by Dupont under the tradename ZYTEL®. HTN. This exemplary family of glass reinforced polyamides is specifically formulated to offer improved heat aging and retain strength and stiffness at elevated temperatures. Of particular use in the present invention are a 50% glass reinforced, heat stabilized, high performance polyamide resin marketed as ZYTEL® HTN54G50HSLR NC010 and a 45% glass reinforced, heat stabilized, lubricated high performance polyamide resin marketed as ZYTEL® HTN51 G45HSLR NC010. According to the manufacturer, the latter polyamide resin has a glass transition temperature of about 286° F. (141° C.) and a melting point of about 572° F. (300° C.). The glass transition temperature of the latter polyamide resin exceeds the ambient service temperature of about 180° F. to about 230° F. that occurs within a typical internal combustion engine in a location near the crankshaft. Other materials having similar characteristics and which meet the preceding criteria are contemplated by the present invention.

This embodiment further includes a metallic hub member 162, which is set within ring 163. Spokes 136 then extend from ring 163. This hub member 162 can take the form shown in U.S. Pat. No. 6,875,113, the disclosure of which is incorporated herein by reference.

As shown in FIG. 9, in this embodiment the annular ring 164 includes an annular weight 166, which is embedded within the injection-molded damper 160. Because the damper is formed from a polymeric composite, the serpentine web in combination with the partial spokes provide vibration absorption. Therefore, this reduces or eliminates the need for elastomeric inserts within the windows 168 and 170. Thus, by choosing the appropriate polymeric material to form the damper 160, one can achieve greater vibration absorption and dampening than with a metal damper.

Figure 10:
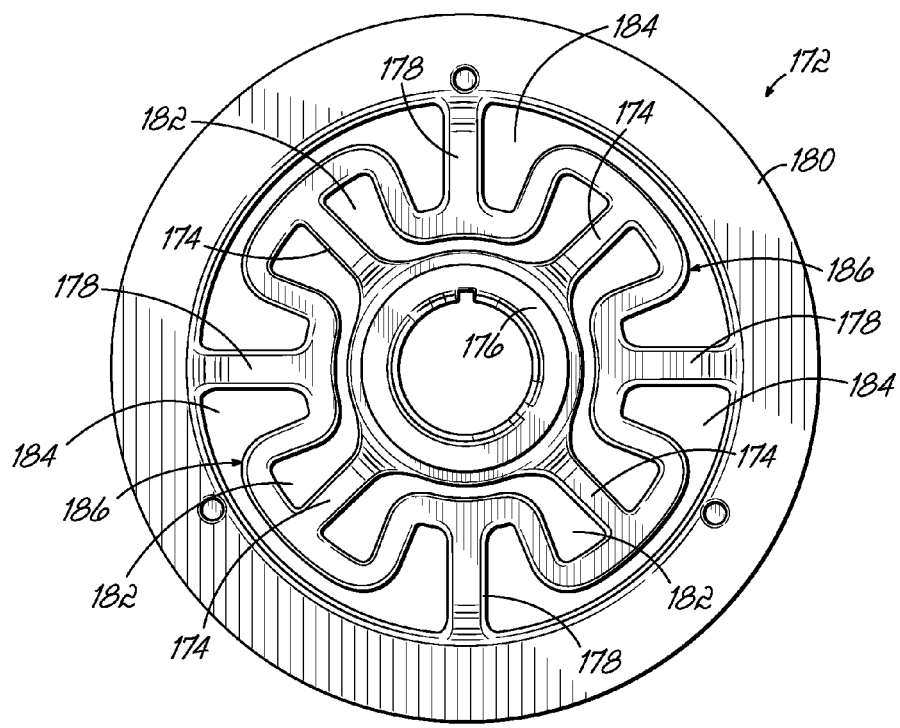
FIG. 10 is a perspective view of a seventh alternate embodiment of the present invention.

FIG. 10 shows an additional alternate embodiment in which a damper 172 includes four partial spokes 174 extending from the hub 176 and four partial spokes 178 extending inwardly from the annular rim 180. Again, depending on the composition of the damper, elastomeric dashpots can be inserted into any of the windows 182, 184 formed between the serpentine web 186 and the annular rim 180, or between the serpentine web 186 and the hub 176.

Further, the dashpot number and location can be changed to obtain the required amount of damping. For example, in any of these embodiments, any window can be filled with an elastomeric member or dashpot to increase damping. Further, alternate materials can be used instead of the elastomers, such as thermoplastic elastomers, foams or silicone derivatives to provide required damping.

Figure 12:
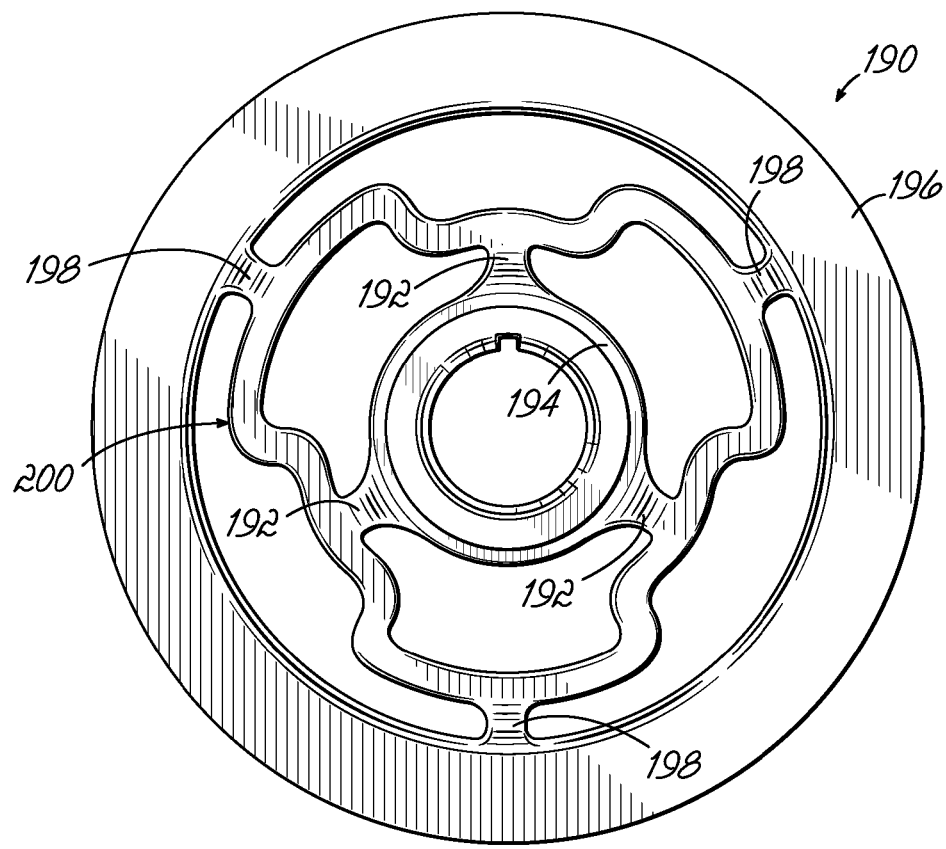
FIG. 12 is a perspective view of an additional embodiment of the present invention.

FIG. 12 shows a damper 190 which incorporates three partial spokes 192 extending from the hub 194 towards the rim 196 and further includes three partial spokes 198 extending from the rim 196 towards the hub 194. These are connected by a serpentine web 200. In this embodiment, the partial spokes 192 and 198 extend less than half the distance from the hub to the annual rim. This demonstrates that the configuration of the spokes and the web can be varied dramatically in order to meet end use requirements. Likewise, adding elastomeric material within the windows can also be used to affect the overall characteristics of the damper.

Thus, the damper of the present invention can be modified in a wide variety of ways to achieve end use requirements. The present invention allows for a vast array of geometries to provide the desired vibration damping. Further, the slip torque of all of the designs is extremely high, since the only mode of failure would be failure of the metallic spokes. Elastomer fatigue should not be an issue with the present invention because the elastomer is not in shear in the traditional sense, but goes through more of a compression state of stress. Further, the elastomeric members may only need to be compressed less than 30%. The manufacture of the damper is simplified, and, therefore, costs reduced because the entire metallic portion of the damper can be machined in a single chuck operation, which should promote axial and radial run out. Finally, the damper can be more compact because everything beyond the outer periphery of the hub acts as part of the spring system for the damper, whereas in a traditional torsional vibration damper, anything inside the elastomeric member did not contribute to the damping and was basically parasitic mass.

This has been a description of the present invention along with the preferred method of practicing the present invention. However, the invention itself should only be defined by the appended claims.

What is claimed is:

1. A vibration damper comprising a hub and an outer annular mass connected to said hub by a spoke system,
   said spoke system including:
   a plurality of first partial spokes extended from said hub towards said annular mass, said first partial spokes spaced from said inner surface of said annular mass;
   a plurality of second partial spokes extended from said inner surface of said annular mass towards said hub wherein said second partial spokes are spaced from said hub;
   an internal web member between said hub and said annular mass connecting ends of adjacent first and second partial spokes and wherein said hub, mass and spoke system are all integral; and
   further comprising first windows formed between said web and said hub and second windows between said web and an inner surface of said annular mass and further comprising a plurality of dashpots located in at least one of said first windows or said second windows.

2. The vibration damper claimed in claim 1 wherein said first and second partial spokes extend greater than half of a distance from said inner surface of said annular mass to an outer surface of said hub.

3. The vibration damper claimed in claim 2 wherein said web is a serpentine web having T-portions at ends of each of said first and second partial spokes and inwardly extended portions connecting adjacent T-members.

4. The vibration damper claimed in claim 1 wherein said spokes, said web and an annular rim are formed from a polymeric material wherein said annular mass is an annular weight embedded in said annular rim.

* * * * *